(12) United States Patent
Cheng

(10) Patent No.: US 11,206,949 B1
(45) Date of Patent: Dec. 28, 2021

(54) HIGH POWER DENSITY TOASTER

(71) Applicant: Brava Home, Inc., Redwood City, CA (US)

(72) Inventor: Shih-yu Cheng, Union City, CA (US)

(73) Assignee: BRAVA HOME, INC., Redwood City, CA (US)

(*) Notice: Subject to any disclaimer, the term of this patent is extended or adjusted under 35 U.S.C. 154(b) by 233 days.

(21) Appl. No.: 16/191,394

(22) Filed: Nov. 14, 2018

Related U.S. Application Data

(60) Provisional application No. 62/586,829, filed on Nov. 15, 2017.

(51) Int. Cl.
| | | |
|---|---|---|
| *A47J 37/08* | (2006.01) | |
| *A47J 37/06* | (2006.01) | |
| *F24C 7/08* | (2006.01) | |

(52) U.S. Cl.
CPC ......... *A47J 37/085* (2013.01); *A47J 37/0857* (2013.01); *A47J 37/0629* (2013.01); *A47J 37/0885* (2013.01); *F24C 7/087* (2013.01)

(58) Field of Classification Search
CPC ... A47J 37/0857; A47J 37/085; A47J 37/0814
USPC .................................. 99/390, 389
See application file for complete search history.

(56) References Cited

U.S. PATENT DOCUMENTS

| | | | |
|---|---|---|---|
| 3,407,285 A | 10/1968 | Jacobs | |
| 4,117,294 A | 9/1978 | Appelquist et al. | |
| 4,335,293 A | 6/1982 | Kobayashi et al. | |
| 4,473,732 A | 9/1984 | Payne | |
| 4,475,024 A | 10/1984 | Tateda et al. | |
| 4,771,154 A | 9/1988 | Bell et al. | |
| 4,800,090 A | 1/1989 | August | |
| 5,349,163 A | 9/1994 | An | |
| 5,665,259 A | 9/1997 | Westerberg | |
| 5,990,454 A | 11/1999 | Westerberg et al. | |
| 6,011,242 A | 1/2000 | Westerberg | |
| 6,013,900 A | 1/2000 | Westerberg et al. | |
| 6,049,070 A * | 4/2000 | Arnedo | A47J 37/085 219/502 |
| 6,069,345 A | 5/2000 | Westerberg | |
| 6,140,621 A * | 10/2000 | Ho | A47J 37/0623 219/492 |
| 6,302,095 B1 | 10/2001 | Tolley et al. | |
| 6,355,915 B1 * | 3/2002 | Ziaimehr | G05D 23/1913 219/412 |
| 6,417,494 B1 | 7/2002 | Westerberg et al. | |
| 6,843,207 B2 | 1/2005 | Kanzaki et al. | |

(Continued)

FOREIGN PATENT DOCUMENTS

| | | |
|---|---|---|
| CN | 101398197 | 4/2009 |
| EP | 1740018 | 1/2007 |

(Continued)

*Primary Examiner* — Reginald Alexander
(74) *Attorney, Agent, or Firm* — Haynes and Boone, LLP

(57) ABSTRACT

Several embodiments include a cooking instrument having: a housing frame defining a slot to fit a food item; a heater mechanically coupled to the housing frame and adapted to produce electromagnetic waves to heat the food item; one or more optical feedback components configured to measure light intensity at one or more regions in the slot perpendicular to an opening of the slot; and a controller configured to control the heater based on an output of the optical feedback components.

22 Claims, 12 Drawing Sheets

(56) References Cited

U.S. PATENT DOCUMENTS

| | | | |
|---|---|---|---|
| 6,914,226 B2* | 7/2005 | Ottaway | A21B 2/00 |
| | | | 219/775 |
| 7,075,442 B2 | 7/2006 | Lion et al. | |
| 7,323,663 B2 | 1/2008 | Cavada et al. | |
| 7,619,186 B2 | 11/2009 | Cavada et al. | |
| 7,683,292 B2 | 3/2010 | Cavada et al. | |
| 8,200,548 B2 | 6/2012 | Wiedl | |
| 8,791,398 B2 | 7/2014 | De la Cuerda Ortin et al. | |
| 8,929,724 B1 | 1/2015 | Mograbi | |
| 9,414,444 B2 | 8/2016 | Libman et al. | |
| 9,460,633 B2 | 10/2016 | Minvielle | |
| 9,528,972 B2 | 12/2016 | Minvielle | |
| 9,927,129 B2 | 3/2018 | Bhogal et al. | |
| 2001/0016222 A1* | 8/2001 | Tomsich | A47J 37/08 |
| | | | 426/523 |
| 2002/0171674 A1 | 11/2002 | Paris | |
| 2005/0173400 A1 | 8/2005 | Cavada et al. | |
| 2006/0162573 A1* | 7/2006 | Yip | A47J 37/085 |
| | | | 99/389 |
| 2006/0289436 A1 | 12/2006 | Carbone et al. | |
| 2008/0259995 A1 | 10/2008 | Kuhn et al. | |
| 2009/0034944 A1 | 2/2009 | Burtea et al. | |
| 2009/0102083 A1 | 4/2009 | Cochran et al. | |
| 2009/0272814 A1 | 11/2009 | Granhed et al. | |
| 2010/0186600 A1 | 7/2010 | Lewis et al. | |
| 2010/0199857 A1 | 8/2010 | Storiz et al. | |
| 2011/0002675 A1 | 1/2011 | Cochran et al. | |
| 2011/0002677 A1 | 1/2011 | Cochran et al. | |
| 2011/0114627 A1 | 5/2011 | Burt | |
| 2011/0114633 A1 | 5/2011 | Niklasson et al. | |
| 2012/0063753 A1 | 3/2012 | Cochran et al. | |
| 2012/0180775 A1 | 7/2012 | Waltz et al. | |
| 2013/0202754 A1 | 8/2013 | Cochran et al. | |
| 2015/0185138 A1* | 7/2015 | Richardson | G01N 21/251 |
| | | | 356/402 |
| 2016/0033140 A1 | 2/2016 | Weaver, Jr. et al. | |
| 2016/0278576 A1* | 9/2016 | Manning | A47J 37/0871 |
| 2016/0327279 A1 | 11/2016 | Bhogal et al. | |
| 2016/0348918 A1 | 12/2016 | Bhogal et al. | |
| 2017/0074522 A1 | 3/2017 | Cheng et al. | |
| 2017/0099988 A1 | 4/2017 | Matloubian et al. | |
| 2017/0211819 A1 | 7/2017 | McKee et al. | |
| 2017/0215233 A1 | 7/2017 | Katz et al. | |
| 2020/0029735 A1* | 1/2020 | Tofaili | A47J 37/085 |

FOREIGN PATENT DOCUMENTS

| | | |
|---|---|---|
| EP | 2515044 | 10/2012 |
| RU | 2006102663 | 8/2007 |
| RU | 2007111953 | 10/2008 |
| RU | 2008111110 | 9/2009 |
| RU | 110892 | 11/2011 |
| WO | WO 98/030941 | 7/1998 |
| WO | WO 2014/086487 | 6/2014 |
| WO | WO 2017/044876 | 3/2017 |

* cited by examiner

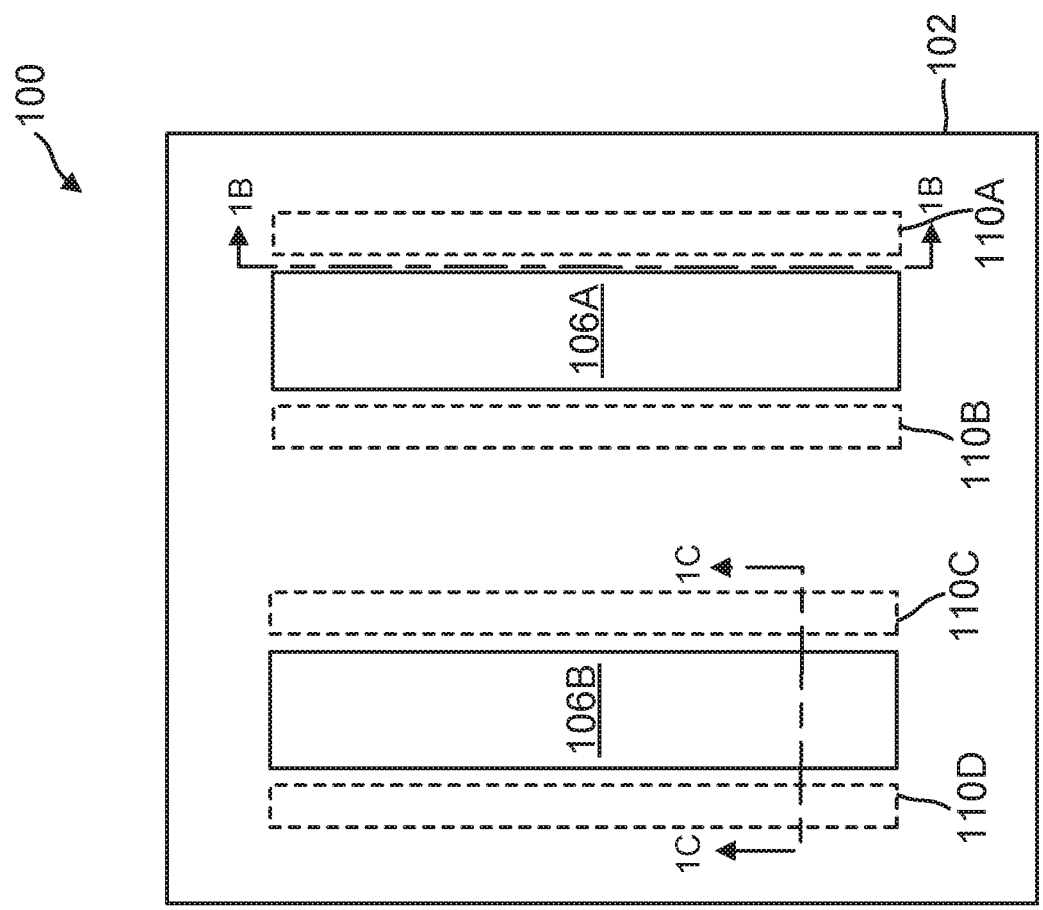

HIGH POWER DENSITY TOASTER

CROSS-REFERENCE TO RELATED APPLICATIONS

This application claims the benefit of U.S. Provisional Patent Application No. 62/586,829, filed Nov. 15, 2017, which is incorporated by reference herein in its entirety.

TECHNICAL FIELD

Various embodiments relate to cooking instruments, such as toasters.

BACKGROUND

Innovation in conventional toasters have been stale for the last few decades. A conventional toaster generally heats up its heating elements overtime, and remains on for a preset duration (e.g., according to the setting on a dial). Such conventional toasters have internal springs that push the slices of bread out of the toaster at the end of that preset duration. These conventional toasters, while useful to consistently produce the same toast given the same type of bread, do not do well when the type or shape of the bread varies and cannot change the amount of time it takes to deliver the same results.

BRIEF DESCRIPTION OF THE DRAWINGS

FIG. 1A is a top view of an example of a toaster, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Conventional toasters usually takes around two minutes to toast bread slices. During that time, the interior moisture of a bread slice would have the opportunity to evaporate. The end result is toasted bread slices that are overly dried. Furthermore, having to wait two minutes or more increases the chance of forgetting about the bread slices and thus overcooking the bread slices.

Various embodiments utilizes a heating element/heater with an electromagnetic emission profile smaller than a larger surface of a food item (e.g., sliced surface of bread). This increases the power density, and thus enable the heating element to quickly toast the bread surface without allowing opportunity for evaporation. To cover regions of the bread slice not directly exposed to the electromagnetic emission (e.g., in near-infrared spectrum, infrared spectrum, visible spectrum, or any combination thereof) of the heating element, various embodiments include a movement mechanism that causes the bread slice and the heating element to move relative to one another.

FIG. 1A is a top view of an example of a toaster 100, in accordance with various embodiments. The toaster includes a housing 102 having multiple slots to make toast (from bread slices). For example, the housing 102 can have a first slot 106A and a second slot 106B (collectively the "slots 106"). In some embodiments, the first slot 106A can be surrounded by a first heater 110A and a second heater 110B. In some embodiments, the total number of heaters in the toaster 100 can be 2N−1 heaters, where N is the number of slots. In these embodiments, neighboring slots can share a heater therebetween. In some embodiments, the total number of heaters is 2N, where for each slot there are two heaters on each of the slots' sides.

Figure 1B:
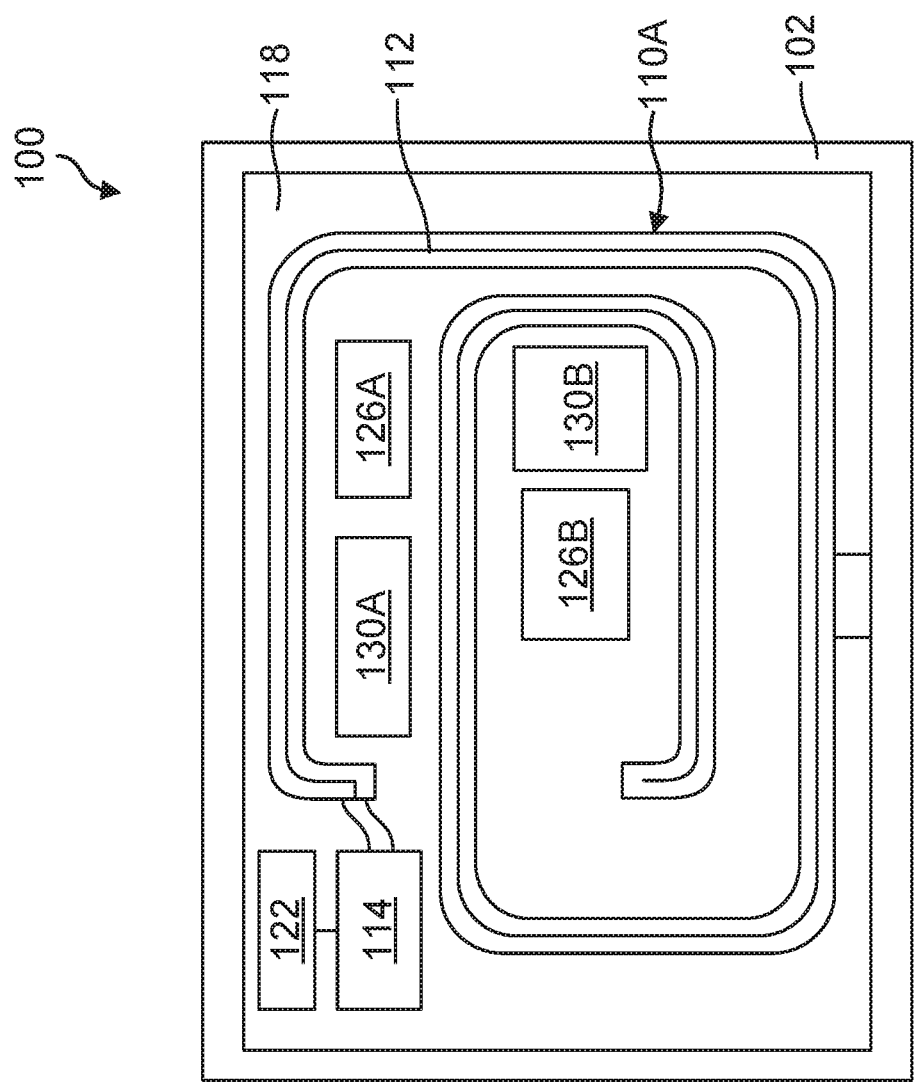
FIG. 1B is a cross-sectional view of the toaster in FIG. 1A.

FIG. 1B is a cross-sectional view of the toaster 100 in FIG. 1A. This cross-sectional view illustrates one example of the first heater 110A on one side of the first slot 106A. The first heater 110A can be one of the heating elements 218 of FIG. 2. In various embodiments, although not shown in the cross-sectional view of FIG. 1B, there is the second heater 110B on the other side of the first slot 106A corresponding to the first heater 110A. The first heater 110A can comprise a filament 112 (e.g., a filament emitting in the near-infrared spectrum, infrared spectrum, visible spectrum, or any combination thereof) driven by a power unit 114 (e.g., the power supply 202). The geometry of the first heater 110A can be spirally shaped (e.g., elliptically or rectangularly spiral). Optionally, the first heater 110A can comprise a heater envelope 118. Optionally, the heater envelope 118 can comprise a reflector or a reflective coating thereon. The reflector or the reflective coating can direct electromagnetic emission (e.g., in the near-infrared spectrum, infrared spectrum, visible spectrum, or any combination thereof) toward the first slot 106A. In some embodiments, the first heater 110A is adapted to directly heat the surface of a food item (e.g., bread slice) in the first slot 106A. In some embodiments, the first heater 110A is adapted to directly heat air between the food item and the first heater 110A.

A controller 122 (e.g., the computing device 206 of FIG. 2) can control the power unit 114. For example, the controller 122 can pulse modulate power provided to the first heater 110A. By adjusting characteristics of such pulse modulation (see FIGS. 8 and 9), the controller 122 can control the emission spectral distribution of the first heater 110A to selectively substantially target the absorption bands of air, bread, or water.

The toaster 100 can include one or more light sensors 126 (e.g., light sensor 126A, light sensor 126B, etc., collectively as the "light sensors 126") and one or more light sources 130 (e.g., light source 130A, light source 130B, etc., collective as the "light sources 130"). Each of the light sensors 126 can detect a color characteristic (e.g., brownness level) of one region of the food item. In one example, at least one of the light sources 130 can transmit light toward the food item and at least one of the light sensors 126 can detect the amount of light reflected off of the food item. In some embodiments, the light sources 130 are respectively proximate to, adjacent to, or in contact with the light sensors 126 configured to detect reflected light therefrom. In another example, a light source (e.g., one of the light sources 130 not shown in the cross-sectional view of FIG. 1B) on the other side of the first slot 106A can transmit light that traverses through the food item to a light sensor (e.g., one of the light sensors 126). The light sensor can then detect the amount of light that transmitted through the food item. In some embodiments, the light source is a directional light source substantially directed towards the light sensor. In various embodiments, the light sensors can be configured to detect reflected light emitted from the first heater 110A or light emitted from another heater on the other side of the first slot 106A, instead of the light sources.

The reflectivity and/or transmissivity detected by the light sensors 126 can be used by the controller 122 to determine the brownness levels corresponding to different regions of the food item in the first slot 106A. In some embodiments, the controller 122 determines the thickness of the food item (e.g., across the different regions) based on the reflectivity and/or transmissivity detected by the light sensors 126. In some embodiments, the light sensors 126 can have an auxiliary light source to detect the insertion of foodstuff (e.g., bread slice) into the first slot 106A. In some embodiments, at least one of the light sensors 126 can include a light filter that enable the controller 122 to detect insertion of the foodstuff into the first slot 106A.

Figure 1C:
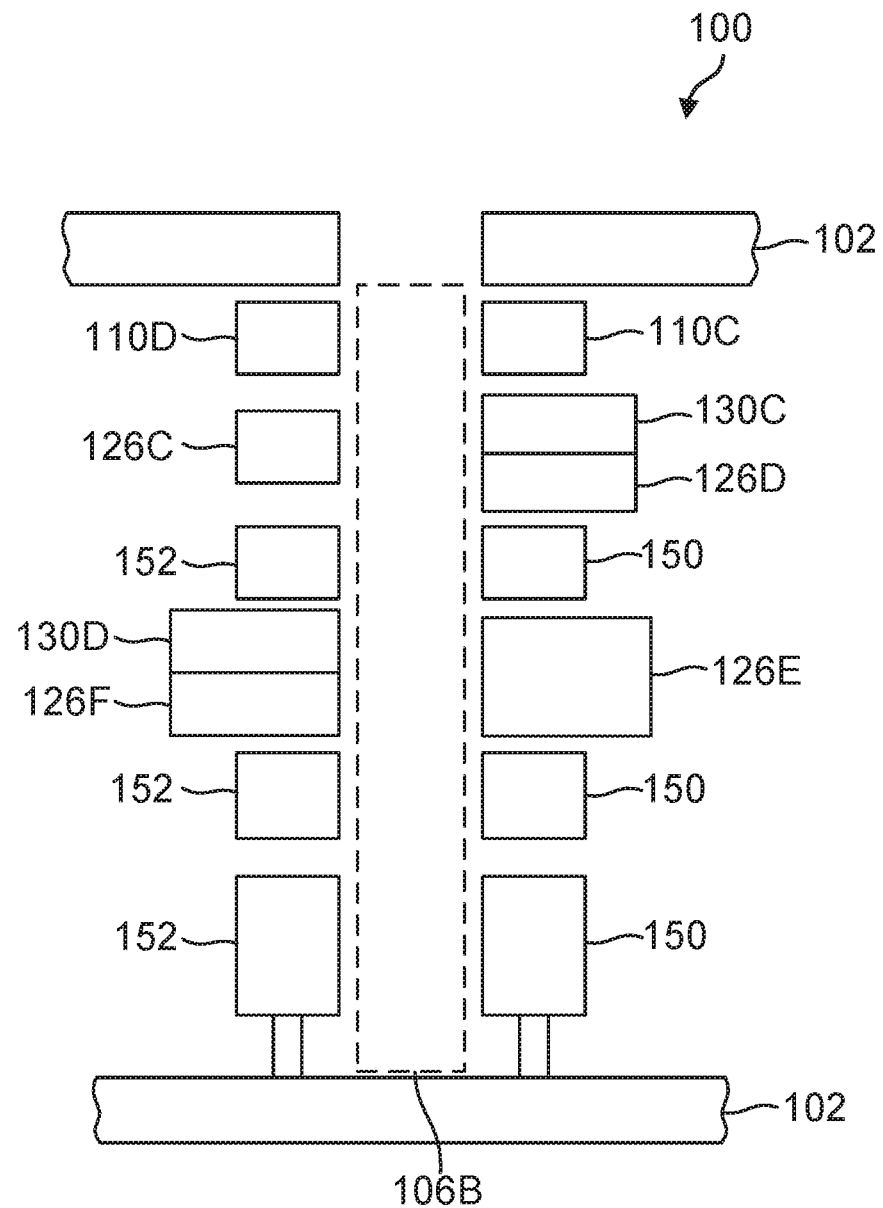
FIG. 1C is a cross-sectional view of the toaster in FIG. 1A showing two heaters respectively on each side of the second slot.

FIG. 1C is a cross-sectional view of the toaster 100 in FIG. 1A showing two heaters (e.g., a third heater 110C and a fourth heater 110D) respectively on each side of the second slot 106B. In some embodiments, a light sensor 126C can be positioned across from a light source 130C spaced apart by the second slot 106B. The light sensor 126C can be used to measure the light transmissivity (e.g., as emitted from the light source 130C) across a target food item in the second slot 106B. In some embodiments, a light sensor 126D can be positioned adjacent to, laterally spaced from, or in contact with the light source 130C. In these embodiments, the light sensor 126D can be used to measure the reflectivity of light off the target food item (e.g., as emitted from the light source 130C).

In some embodiments, a light sensor 126E can be positioned across from a light source 130D spaced apart by the second slot 106B. The light sensor 126E can be used to measure the light transmissivity (e.g., as emitted from the light source 130D) across a target food item in the second slot 106B. In some embodiments, a light sensor 126F can be positioned adjacent to, laterally spaced from, or in contact with the light source 130D. In these embodiments, the light sensor 126F can be used to measure the reflectivity of light off the target food item (e.g., as emitted from the light source 130D).

Figure 2:
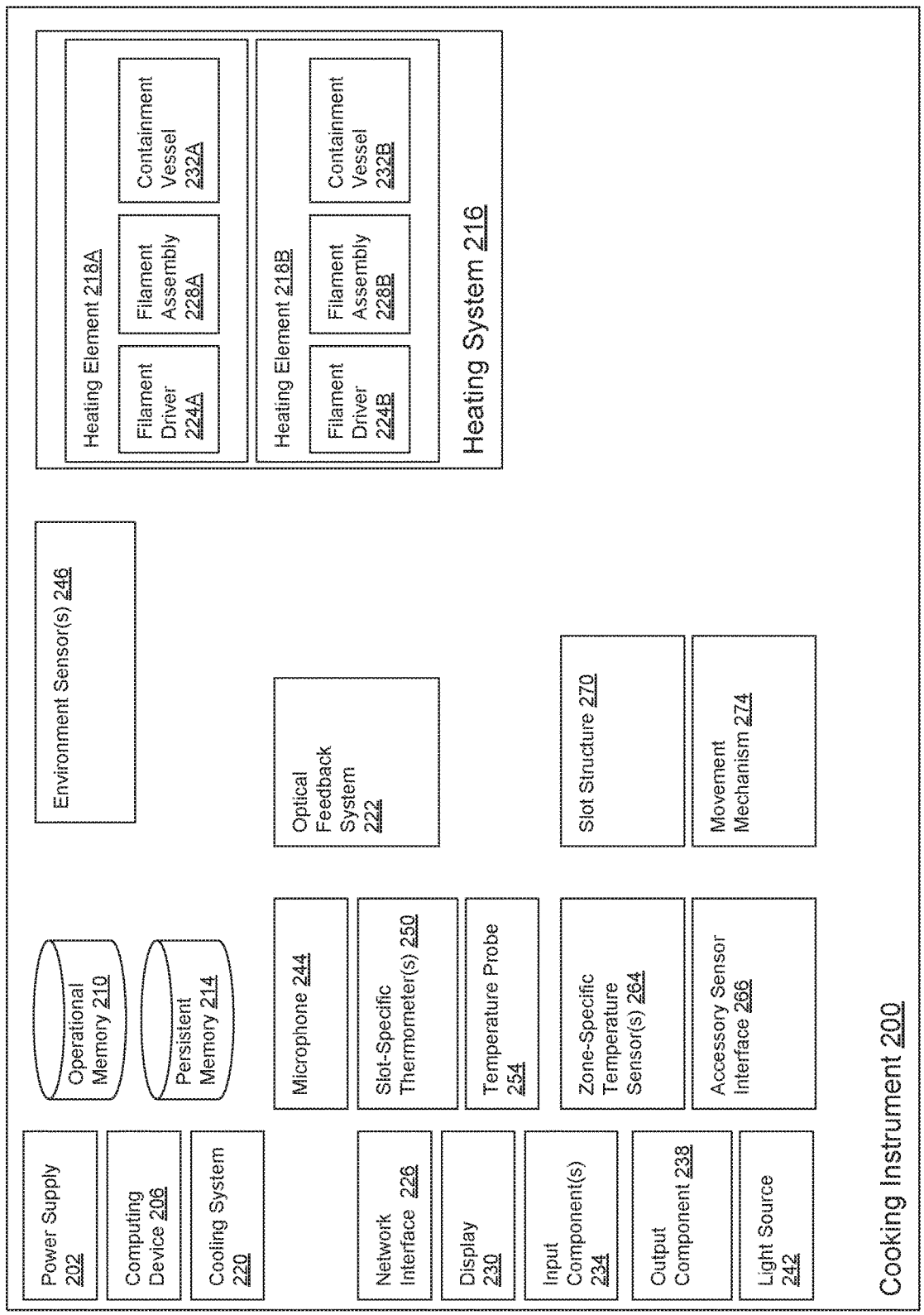
FIG. 2 is a block diagram illustrating physical components of a cooking instrument, in accordance with various embodiments.

FIG. 2 is a block diagram illustrating physical components of a cooking instrument 200 (e.g., the toaster 100), in accordance with various embodiments. The cooking instrument 200 can include a power supply 202, a computing device 206, an operational memory 210, a persistent memory 214, a heating system 216 with one or more heating elements (e.g., a heating element 218A, a heating element 218B, etc., collectively as the "heating elements 218"), a cooling system 220, an optical feedback system 222, a network interface 226, a display 230, an input component 234, an output component 238, a light source 242, a microphone 244, one or more environment sensors 246, one or more slot-specific thermometers 250, a temperature probe 254, or any combination thereof. In some embodiments, each of the heating elements 218 is individually tunable (e.g., by the computing device 206) to change its emission spectral power distribution independent of others. The optical feedback system 222 can be a collection of one or more light sensors and one or more light sources (e.g., emitting light that is visible, non-visible, or a combination thereof).

The computing device 206, for example, can be a control circuit. The computing device 206 serves as the control system for the cooking instrument 200. The control circuit can be an application-specific integrated circuit or a circuit with a general-purpose processor configured by executable instructions stored in the operational memory 210 and/or the persistent memory 214. The computing device 206 can control all or at least a subset of the physical components and/or functional components of the cooking instrument 200.

The power supply 202 provides the power necessary to operate the physical components of the cooking instrument 200. For example, the power supply 202 can convert alternating current (AC) power to direct current (DC) power for the physical components. In some embodiments, the power supply 202 can run a first powertrain to the heating elements 218 and a second powertrain to the other components. In some cases, the first powertrain is an AC powertrain and the second powertrain is a DC powertrain.

The computing device 206 can control peak wavelengths and/or spectral power distributions (e.g., across different wavelengths) of the heating elements 218. The computing device 206 can implement various functional components (e.g., see FIG. 3) to facilitate operations (e.g., automated or semi-automated operations) of the cooking instrument 200. For example, the persistent memory 214 can store one or more cooking recipes. Each cooking recipe can include one or more heating sequences containing executable instructions (e.g., executable by the computing device 206) to drive the heating elements 218. The operational memory 210 can provide runtime memory to execute the functional components of the computing device 206. In some embodiments, the persistent memory 214 and/or the operational memory 210 can store light intensity values, image files or video files captured by the optical feedback system 222.

The heating elements 218 can be wavelength controllable (e.g., capable of changing its spectral power distribution). For example, the heating elements 218 can include quartz tubes, each enclosing one or more heating filaments. In various embodiments, the side of the quartz tubes facing toward the chamber wall instead of the interior of the chamber is coated with a heat resistant coating. The operating temperature of the heating filaments can be extremely high. Hence, the cooling system 220 can provide cooling (e.g., convectional or otherwise) to prevent the heat resistant coating from melting or vaporizing.

The heating elements 218 can respectively include filament drivers (e.g., respectively a filament driver 224A and a filament driver 224B, collectively as the "filament drivers 224"), filament assemblies (e.g., respectively filament assembly 228A and filament assembly 228B, collectively as the "filament assemblies 228B"), and containment vessels (e.g., respectively containment vessel 232A and containment vessel 232B, collectively as the "containment vessels 232"). For example, each heating element can include a filament assembly housed by a containment vessel. The filament assembly can be driven by a filament driver. In turn, the filament driver can be controlled by the computing device 206. For example, the computing device 206 can instruct the power supply 202 to provide a set amount of power to the filament driver. In turn, the computing device 206 can instruct the filament driver to drive the filament assembly to generate electromagnetic waves (i.e., a form of wireless electromagnetic energy) with one or more selected peak wavelengths and/or other particular characteristics defining a spectral power distribution type.

The optical feedback system 222 serves various functions in the operation of the cooking instrument 200. For example, the optical feedback system 222 and the display 230 together can provide a virtual window to the inside of the chamber despite the cooking instrument 200 being windowless. The optical feedback system 222 can serve as a food package label scanner that configures the cooking instrument 200 by recognizing a machine-readable optical label of the food packages. In some embodiments, the optical feedback system 222 can enable the computing device 206 to use optical feedback when executing a cooking recipe. In several embodiments, the light source 242 can illuminate the interior of the cooking instrument 200 such that the optical feedback system 222 can clearly capture an image of the food substance therein.

The network interface 226 enables the computing device 206 to communicate with external computing devices. For example, the network interface 226 can enable Wi-Fi or Bluetooth. A user device can connect with the computing device 206 directly via the network interface 226 or indirectly via a router or other network devices. The network interface 226 can connect the computing device 206 to an external device with Internet connection, such as a router or a cellular device. In turn, the computing device 206 can have access to a cloud service over the Internet connection. In some embodiments, the network interface 226 can provide cellular access to the Internet.

The display 230, the input component 234, and the output component 238 enable a user to directly interact with the functional components of the computing device 206. For example, the display 230 can present images from the optical feedback system 222. The display 230 can also present a control interface implemented by the computing device 206. The input component 234 can be a touch panel overlaid with the display 230 (e.g., collectively as a touchscreen display). In some embodiments, the input component 234 is one or more mechanical devices (e.g., buttons, dials, switches, or any combination thereof). In some embodiments, the output component 238 is the display 230. In some embodiments, the output component 238 is a speaker or one or more external lights.

In some embodiments, the cooking instrument 200 includes the microphone 244, and/or the one or more environment sensors 246. For example, the computing device 206 can utilize the audio signal, similar to images from the optical feedback system 222, from the microphone 244 as dynamic feedback to adjust the controls of the heating elements 218 in real-time according to a heat adjustment algorithm (e.g., a part of a dynamic heating sequence). In one example, the computing device 206 can detect an audio signal indicative of a fire alarm, a smoke alarm, popcorn being popped, or any combination thereof. For example, the computing device 206 can adjust the heating system 216 according to the detected audio signal, such as turning off the heating elements 218 in response to detecting an alarm or in response to detecting a series of popcorn noise followed by silence/low noise. The environment sensors 246 can include a pressure sensor, a humidity sensor, a smoke sensor, a pollutant sensor, or any combination thereof. The computing device 206 can also utilize the outputs of the environment sensors 246 as dynamic feedback to adjust the controls of the heating elements 218 in real-time according to a heating sequence instruction (e.g., a heat adjustment algorithm).

In some embodiments, the cooking instrument 200 includes the slot-specific thermometers 250, the temperature probe 254, one or more zone-specific temperature sensors 264, an accessory sensor interface 266, or any combination thereof. The zone-specific temperature sensor 264 can measure the temperature at one or more zones in each slot (e.g., the first slot 106A and/or the second slot 106B). The zone-specific temperature sensor 264 can be embedded in or attached to a housing frame (e.g., the housing 102) of the cooking instrument 200. The accessory sensor interface 266 can be a wired or wireless interface capable of receiving sensor signals from an accessory of the cooking instrument 200. For example, an accessory (not shown) can include a temperature sensor that reports the temperature experienced at the accessory to the computing device 206. For example, the computing device 206 can utilize the temperature readings from the slot-specific thermometers 250, the temperature probe 254, the zone-specific temperature sensor 264, the accessory sensor interface 266, or any combination thereof, as dynamic feedback to adjust the controls of the heating elements 218 in real-time according to a heat adjustment algorithm. The temperature probe 254 can be adapted to be inserted into food to be cooked by the cooking instrument 200. The computing device 206 can also utilize the outputs of the temperature probe 254 as dynamic feedback to adjust the controls of the heating elements 218 in real-time according to a heat adjustment algorithm. For example, the heat adjustment algorithm of a cooking recipe can dictate that the food should be heated at a preset temperature for a preset amount time according to the cooking recipe.

Example Implementations

In some example implementations, the heating system 216 includes at least a tunable heating element (e.g., one of the heating elements 218) capable of emitting wireless energy into a cooking chamber (e.g., the cooking chamber 102). To start a process of cooking food, the computing device 206 (e.g., the control system of the cooking instrument 200) can first determine (e.g., identify, select, or infer) a food substance or a food cooking recipe. For example, the computing device 206 can determine the food substance as being in the cooking chamber or intended to be in the cooking chamber. The determination of the food substance can be by image recognition (e.g., using data captured by the optical feedback system 222), user input (e.g., using data from the network interface 226 and/or from the input component 234), voice recognition (e.g., using data captured by from a microphone 244), or any combination thereof.

The computing device 206 can be configured to generate, based on an identity of the food substance or the food cooking recipe, a heating sequence to drive the heating system 216. For example, the heating sequence includes or references parameters to determine how to provide power to the tunable heating element to cause the tunable heating element to emit according to a target spectral power distribution. When generating the heating sequence, the target spectral power distribution can be selected to match the absorption spectrum of the food substance or an intermediary cooking medium (e.g., air, cooking platform/tray, water surrounding the food substance, etc.) for cooking the food substance.

In some cases, the computing device 206 can select the food cooking recipe based on identification of food substance by the computing device 206. In some cases, the computing device 206 can infer an expectation of a certain type of food substance to be cooked, in response to receiving a user selection of the food cooking recipe. In some cases, the computing device 206 is configured to generate the heating sequence neither with the identification of food substance nor with an inferred expectation of what food substance is expected to be cooked.

The computing device 206 can be configured to detect trigger events dictated by or specified in one or more heating sequences of one or more food cooking recipes. For example, the logic of the heating sequence can include an instruction to adjust a spectral power distribution of the wireless energy emitted from the tunable heating element in response to the computing device 206 detecting a particular trigger event. After the heating sequence is initiated, the computing device 206 starts to monitor for the detection of the trigger event. In response to detecting the trigger event, the computing device 206 can configure the heating system to adjust the spectral power distribution of the emitted wireless energy from the tunable heating element. In some embodiments, the heating sequence includes an instruction to simultaneously adjust, based on a trigger event detectable by the computing device 206, a plurality of spectral power distributions of wireless waves emitted respectively from the multiple heating elements 218 in the heating system 216. In some cases, the instruction can specify a target spectral power distribution as corresponding to one of the trigger event. In some cases, the instruction can specify a target object category (e.g., defined by foodstuff shape, foodstuff size, foodstuff material, or any combination thereof) associated with the target spectral power distribution as corresponding to one of the trigger event.

In some embodiments, the persistent memory 214 stores a logic function or a database (e.g., a lookup table) that associates target object categories (e.g., defined by material, size, shape, etc.) respectively with wavelength-specific configurations (e.g., each wavelength-specific configuration associated with a target spectral power distribution and/or how to adjust the spectral power distribution to the target spectral power distribution). Instructions in a heating sequence can reference the logic function or the database to identify a wavelength-specific configuration associated with a target spectral power distribution. A wavelength-specific configuration can be associated with a set of one or more parameters that configure the computing device 206 to send a control signal to the heating system 216. The control signal can correspond to characteristics indicative of a target spectral power distribution of waves emitted from the tunable heating element.

A wavelength-specific configuration can be associated with one or more absorbent wavelengths, transmissive wavelengths, or reflective wavelengths of one or more materials in or that are part of the cooking chamber. For example, the materials can include food, glass, metal, air, or any combination thereof. The computing device 206 can be configured to determine that a target foodstuff category (e.g., user-specified, recipe-specified, or image-sensor-identified) or a target intermediary cooking medium is in a target object category and drive the tunable heating element according to the wavelength-specific configuration associated with the target object category according to the database in the persistent memory 214. In some embodiments, the absorptivity characteristic of the target object category allows for multiple wavelength-specific configurations. In those embodiments, a single wavelength-specific configuration can be selected by the computing device 206 to optimize for available power density (e.g., cooking speed) based on the absorptivity band(s) of the target object category.

In some embodiments, aside from adjusting the spectral power distribution, the heating sequence can also include instructions to adjust the intensity, duration, pulse pattern, or any combination thereof, of the wireless energy emitted from the tunable heating element. Execution of the instruction can be dynamic or sequentially timed. That is, the trigger event can be a time-based event, a modeled or simulated event, an event triggered by neural network, a user indicated event, or a sensor data indicated event.

In various embodiments, the spectral power distribution of waves emitted from a tunable heating element is adjusted by modulating power provided to the tunable heating element to tune the temperature of the tunable heating element to a particular range. In some embodiments, the power supply 202 is adapted to supply electrical power to the tunable heating element according to instructions from the computing device 206. The power supply 202 can draw power from an AC wall outlet. For example, the power supply 202 can include an AC power plug adapted to connect with the wall outlet. In some embodiments, the power supply 202 provides pulse modulated or phase-fired control of electrical power to the tunable heating element. For example, the pulse modulated electrical power can be modulated DC power or rectified half-cycle AC power.

Figure 8:
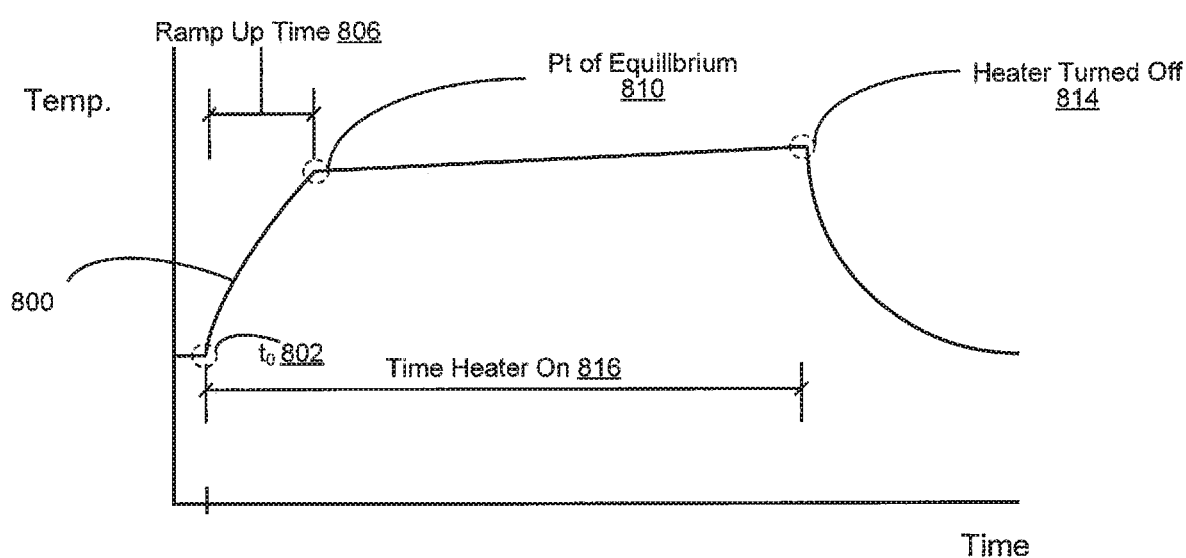
FIG. 8 is a graph illustrating a temperature trace of a heating element over time using an unmodulated method of driving the heating element.

In some cases, the computing device 206 can adjust the spectral power distribution of the tunable heating element by adjusting a duration that the power supply 202 is supplying power to the tunable heating element. For example, the persistent memory 214 can store a driver parameter. The driver parameter can be associated with a target spectral power distribution or at least a characteristic thereof. The driver parameter can be correlated with a variation of the spectral power distribution as a function of time that the tunable heating element is continuous turned on without a substantial pause (e.g., duration of what constitute "substantial pause" can be stored as a parameter as well). The computing device 206 can adjust the duration based on the driver parameter and the known time that the tunable heating element has been continuously turned on. Alternatively, the driver parameter can be correlated with variation to the spectral power distribution as a function of an operational core temperature of the tunable heating element. The computing device 206 can adjust the duration based on the driver parameter and the known operational core temperature of the tunable heating element. The function represented by the driver parameter advantageously enables the computing device 206 to tune the spectral power distribution emitted from a single heating element. The applied power duty cycle in combination with known physical characteristics can be used to estimate operating core temperature of the tunable heating element because temperature increases over time whenever a tunable heating element is connected to electrical power up until equilibrium temperature is reached. Equilibrium is when temperature dissipation is substantially equal and opposite to temperature increase. This effect is illustrated in the graph of FIG. 8.

In some embodiments, the power supply 202 includes a power control mechanism capable of switching power on or off to the tunable heating element. In some embodiments, the power control mechanism is a binary power switch. In some embodiments, the power control mechanism provides more than two states of power connections, such as an off state, a maximum power state, and one or more reduced power states. In these embodiments, the computing device 206 is configured to adjust the spectral power distribution of the tunable heating element to a target spectral power distribution by pulse modulating using the power control mechanism (e.g., according to a control signal from the control system to the power control mechanism). For example, the computing device 206 can pulse modulate the power control mechanism until a target core temperature of the tunable heating element is reached. The persistent memory 214 can store an association between the target spectral power distribution and the target core temperature such that the computing device 206 can determine that they correspond to each other during operation of the heating system 216. The persistent memory 214 can store an association between a pulse modulation configuration (e.g., pulse frequency, pulse width/duty cycle, pulse intensity, or any combination thereof) and a target spectral power distribution.

The computing device 206 can be configured to slow (e.g., decrease in frequency) the pulse modulating of the power control mechanism when an estimated operational temperature of the tunable heating element is above a threshold temperature, when the power control mechanism has been in a particular state for more than a threshold duration, and/or when the power control mechanism has been in a particular state for more than a threshold amount in a preset duration. The particular state can be either an "on" state or an "off state". The slowing of the pulse modulation can include stopping the pulse modulation. Threshold amount can be measured as a fraction or a percentage within preset duration that the power control mechanism is in the particular state. Similar to the mechanism of slowing, the computing device 206 can be configured to speed up (e.g., decrease in frequency) the pulse modulating of the power control mechanism when an estimated operational temperature of the tunable heating element is below a threshold temperature, when the power control mechanism has been in a particular state for less than a threshold duration, and/or when the power control mechanism has been in a particular state for less than a threshold amount in a preset duration.

Toast movement mechanism Each of the heating elements 218 has at least one surface emitting/producing electromagnetic waves ("emission surface"). A slot structure 270 can be part of a housing frame of the cooking instrument 200 that defines one or more slots to fit one or more slices of bread or other foodstuff. The slot structure 270 can be mechanically coupled to one or more of the heating elements 218. A movement mechanism 274 can be adapted to cause such heating elements 218 and the foodstuff in the slot structure 270 to move relative to one another. For example, the movement mechanism 274 can move one or more of the heating elements 218 (e.g., while the food item in the slot structure 270 remains stationary). For another example, the movement mechanism 274 can move the food item (e.g., while the heating elements 218 and/or the slot structure 270 remain stationary). For another example, the movement mechanism 274 can move the slot structure 270 (e.g., while the heating elements 218 remain stationary). The computing device 206 can control power supplied to such heating elements 218 and/or the movement mechanism 274 to time the movement relative to the heating power to dynamically control where and when the foodstuff is toasted. In some embodiments, at least a portion of the optical feedback system 222 (e.g., a light source and/or a light sensor) is mechanically coupled to the movement mechanism 274 and/or one or more of the heating elements 218.

The optical feedback system 222 (e.g., a system comprising one or more light sensors and one or more light sources) can be capable of emitting electromagnetic waves and sensing (e.g., including characterizing) the electromagnetic waves after such waves traverse into a slot defined by the slot structure 270. The computing device 206 can control power to the heating system 216 based on at least a measurement of the sensed electromagnetic waves. In some embodiments, the light sources of the optical feedback system 222 can include one or more of the heating elements 218. In some embodiments, the computing device 206 can utilize a measurement from the optical feedback system 222 to control the power supplied to the heating system 216. In some embodiments, the computing device 206 utilizes a measurement from the optical feedback system 222 to control how and/or when the movement mechanism 274 move. In some embodiments, the computing device 206 can utilize a measurement from the optical feedback system 222 to determine a color characteristic of a food object in the slot. The computing device 206 can present the color characteristic to the user (e.g., via the output component 238 and/or the display 230) or utilize the color characteristic to configure the heating system 216 and/or the movement mechanism 274.

In some embodiments, the slot structure 270 has a movable platform adapted to hold a food item (e.g., a slice of bread). In some embodiments, at least a portion of the optical feedback system 222 is mechanically coupled to the slot structure 270. In some embodiments, one or more of the heating elements 218 is located within the slot. In some embodiments, one or more of the heating elements 218 is embedded at least partially in the slot structure 270 (e.g., acting as a part of the walls defining the slot). In some embodiments, one or more of the heating elements 218 is otherwise partially or completely exposed (e.g., thermally and/or physically exposed) in the slot.

In some embodiments, the movement mechanism 274 can slide one or more of the heating elements 218 along a linear axis (e.g., up and/or down or laterally) parallel, adjacent to, and/or substantially proximate to the slot defined by the slot structure 270. In some embodiments, the movement mechanism 274 can scan across the food item in the slot in a non-linear fashion (e.g., rotationally or otherwise angularly). In some embodiments, the slot structure 270 includes rails on opposing sides of the slot to enable the distal ends of one or more of the heating elements 218 to slide along them (see e.g., FIG. 4). In some embodiments, the movement mechanism 274 includes a rotational component (e.g., a hinge or bearing) enabling it to pivot or otherwise rotate one or more of the heating elements 218, the food item in the slot, the slot structure 270, or any combination thereof (see e.g., FIG. 5). The movement mechanism 274 can perform an angular sweep (like a clock hand) across a region parallel to the slot (e.g., parallel to a widest surface of the food item and/or the slot).

In some embodiments, the movement mechanism 274 is adapted to move a food item (e.g., the slice of bread) in the slot. For example, the movement mechanism 274 can be mechanically coupled to the slot structure 270 and include one or more holders (e.g., a structure adapted to hold the food item). For example, the movement mechanism 274 can include two holders to hold the food item. In some embodiments, the holders can be cylinders. The computing device 206 can be configured to move or rotate each of the holders to adjust the food item's relative position to the heating elements 218. In some cases, the cylinders can have rough surfaces and/or have spikes such that, when rotated, the food item would be moved downward toward the heating elements 218. In some cases, the cylinders can have smooth surfaces such that when the cylinders move apart from one another, the food item slides down. In some embodiments, the cylinders are spring-loaded with a spring force directed towards each other (e.g., see FIG. 6).

Figure 7:
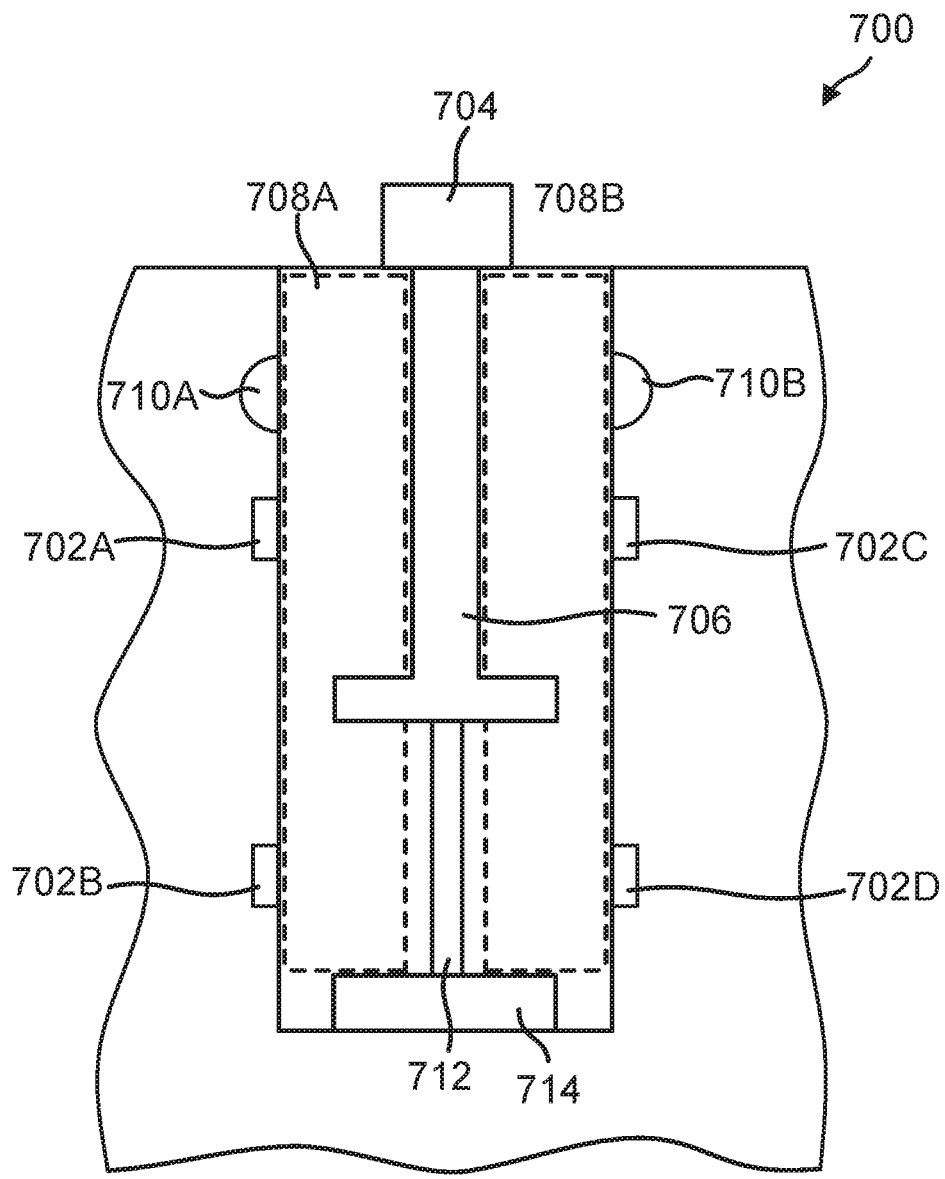
FIG. 7 is a cross-sectional view of an example of a toaster, in accordance with various embodiments.

In some embodiments, the movement mechanism 274 includes a descent carry system (see e.g., FIG. 7). The descent carry system can include a carrier/descent platform that allows the movement mechanism 274 to control its movement (e.g., to descend). In one example, the movement mechanism 274 can control the movement of the carrier platform with a motor or a servo that directly moves the carrier platform down (or up) toward or away from the heating elements 218. Optionally, a rail along the carrier platform can be used to guide the carrier platform to move up or down the slot defined by the slot structure 270. In one example, the movement mechanism 274 controls the movement using a braking mechanism that slows down descent of the carrier platform (whose descent is caused by gravity and weight of the foodstuff on the carrier platform). In these examples, the movement mechanism 274 can control the speed of the descent.

In some embodiments, the movement mechanism 274 can be adapted to scan the heating element 218A or the heating element 218B across regions parallel, adjacent, and/or substantially proximate to a wall defining the slot. In some embodiments, the output of the optical feedback system 222 is a light intensity measurement indicative of transmissivity or reflectivity of electromagnetic waves at a particular wavelength, set of wavelengths, or range of wavelengths. For example, transmissivity of light can be derived (by the computing device 206 and/or the optical feedback system 222) from a sensor reading of a light sensor on the other side of the food item from a light source emitting at a known emission intensity and/or a known spectral power distribution. For example, reflectivity of light can be derived (by the computing device 206 or the optical feedback system 222) from a sensor reading of a light sensor on the same side of the food item from a light source emitting at a known emission intensity and/or a known spectral power distribution.

Figure 3:
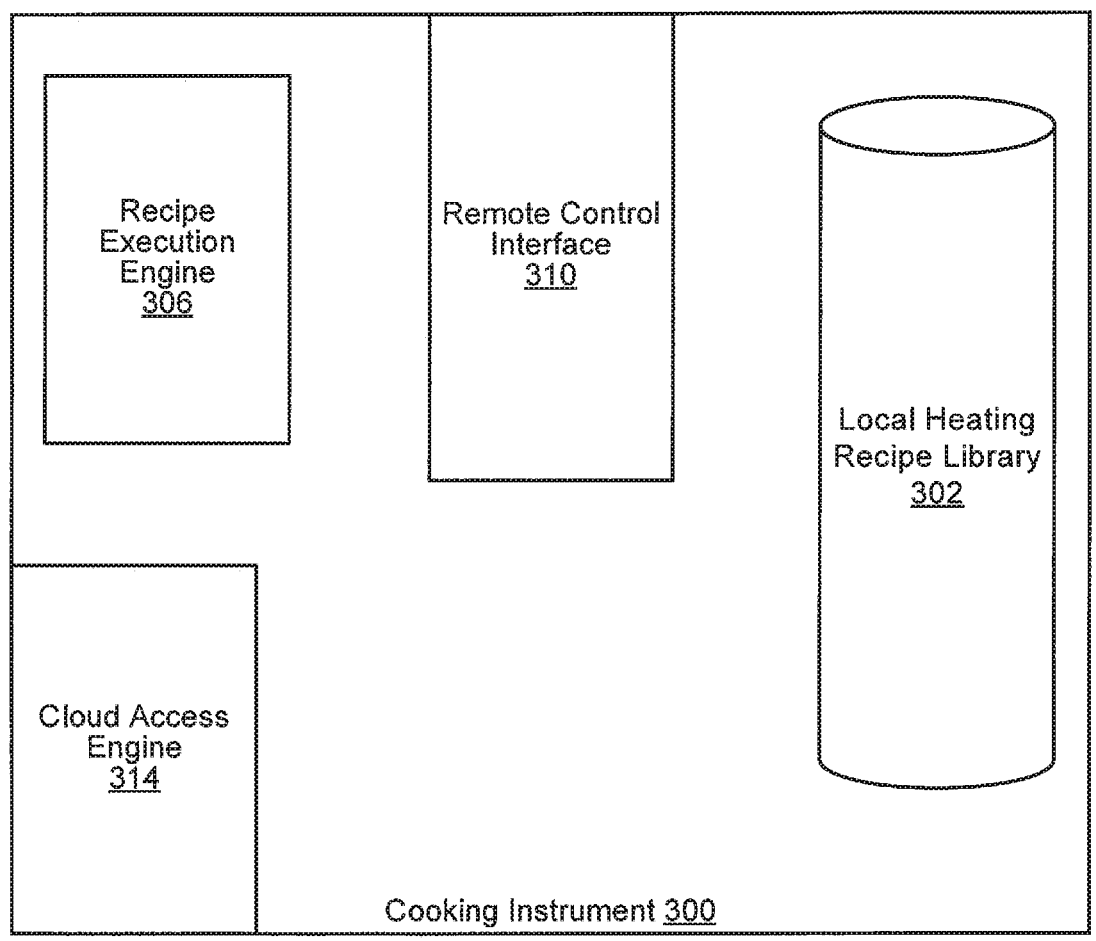
FIG. 3 is a block diagram illustrating functional components of a cooking instrument, in accordance with various embodiments.

FIG. 3 is a block diagram illustrating functional components of a cooking instrument 300 (e.g., the toaster 100 and/or the cooking instrument 200), in accordance with various embodiments. For example, the functional components can run on the computing device 206 or one or more specialized circuits. For example, the cooking instrument 300 can implement at least a cooking recipe library 302, a recipe execution engine 306, a remote control interface 310, a cloud access engine 314, or any combination thereof. The cooking recipe library 302 stores one or more cooking recipes, each cooking recipe including one or more heating sequences respectively for one or more portions of food. The recipe execution engine 306 interprets the executable instructions from the cooking recipes and its heating sequences. The remote control interface 310 enables the functional components of the cooking instrument 300 to be controlled by an external user device (not shown). The remote control interface 310 can enable the external user device to configure the functional components of the cooking instrument 300 or to request information from the external user device. For example, the remote control interface 310 can connect with the external user device via the network interface 226. The cloud access engine 314 enables the cooking instrument 300 to communicate with a backend server system (not shown) to configure the functional components of the cooking instrument 300 or to request information from the backend server system.

In some examples, the recipe execution engine 306 can load and interpret a set of instructions to implement a cooking recipe, including executing a heating sequence (e.g., dynamic segments, static segments, or any combination thereof). In this example, the remote control interface 310 is configured to send a message to an external user device to confirm the automatically selected cooking recipe. In some examples, the recipe execution engine 306 is configured to present the cooking recipe for confirmation on a local display and to receive the confirmation a local input component when the cooking recipe is displayed. In response to the selection of the cooking recipe, the recipe execution engine 306 can execute a heating sequence in accordance of the cooking recipe by controlling the heating elements. The heat adjustment algorithm is capable of dynamically controlling the heating elements 218 (e.g., adjusting output power, spectral power distribution, and/or peak wavelength(s)) in real-time in response to changing input variables (e.g., real-time sensor inputs, user inputs, external user device or backend server system provided parameters, or any combination thereof).

The remote control interface 310 can be used to interact with a user. For example, a user device (e.g., a computer or a mobile device) can connect to the remote control interface via the network interface 226. Via this connection, the user can configure the cooking instrument 300 in real-time. In one example, the user can select a cooking recipe via a user-device-side application running on the user device. The user-device-side application can communicate the remote control interface 310 to cause the cooking instrument 300 to execute the selected cooking recipe. The cloud access engine 314 can enable the cooking instrument 300 to access a cloud service to facilitate execution of a cooking recipe and/or update the cooking recipes in the cooking recipe library 302.

Components (e.g., physical or functional) associated with the cooking instrument (e.g., the toaster 100, the cooking instrument 200, and/or the cooking instrument 300) can be implemented as devices, modules, circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

Figure 4:
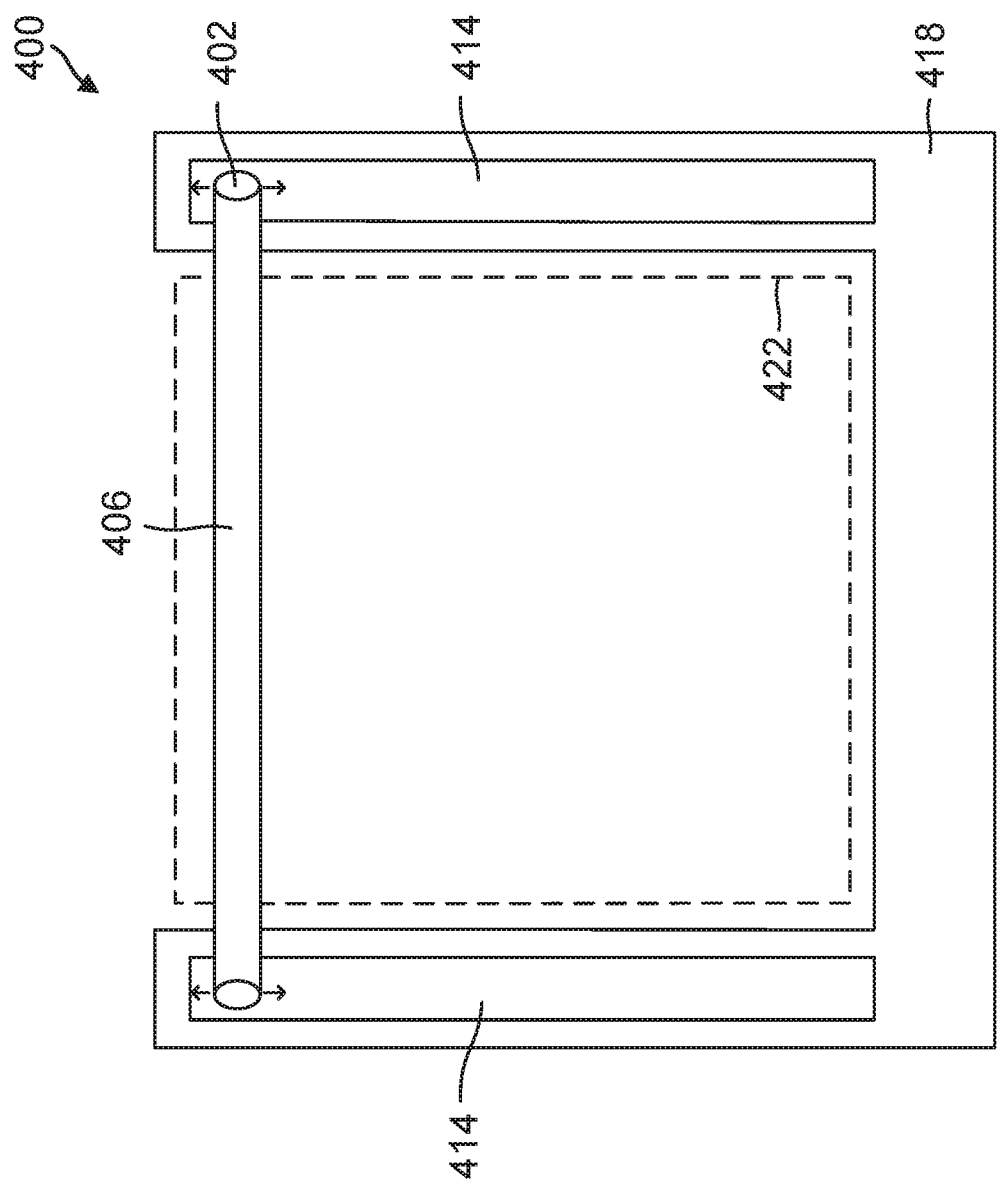
FIG. 4 is a cross-sectional view of an example of a toaster, in accordance with various embodiments.

FIG. 4 is a cross-sectional view of an example of a toaster 400, in accordance with various embodiments. FIG. 4, for example, can represent an alternative embodiment to FIG. 1B. Instead of a stationary heater fixed to its housing frame, the toaster 400 in FIG. 4 includes a movement mechanism 402 that enables a heater 406 to sweep linearly across a food item in a slot 410 of the toaster 400. The movement mechanism 402 can include couplers on distal ends of the heater 406 that enable the heater 406 to slide up and down rails 414 on a housing frame 418. The rails 414 can include at least two individual rails on each side of a slot 422 in the housing frame 418. In some embodiments, the movement mechanism 402 includes a motor that moves the couplers up or down the rails 414. In some embodiments, an external monitor can move the couplers up and down the rails 414. Such motor or external monitor can be controlled by a controller (e.g., the computing device in FIG. 2).

Figure 5:
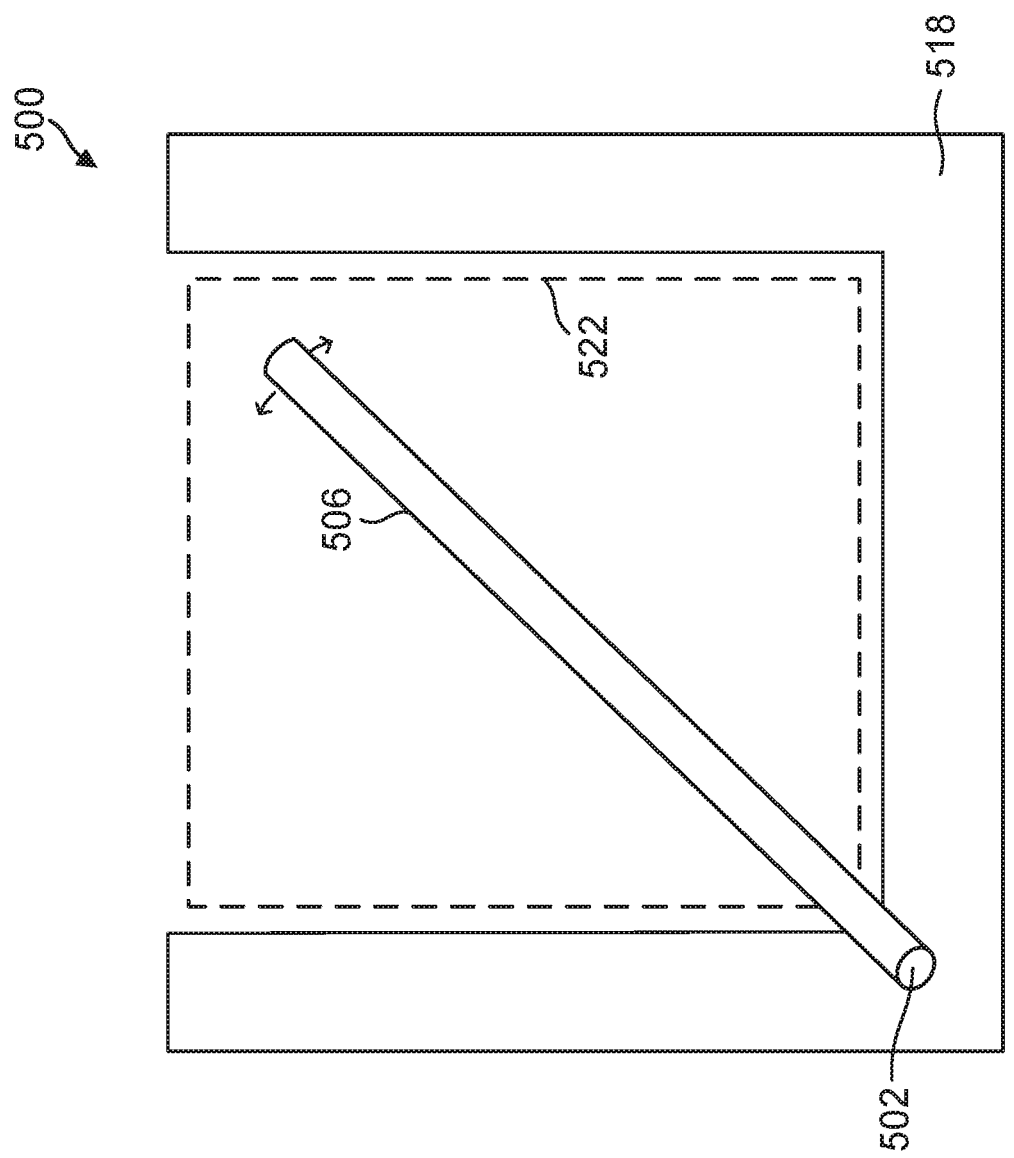
FIG. 5 is a cross-sectional view of an example of a toaster, in accordance with various embodiments.

FIG. 5 is a cross-sectional view of an example of a toaster 500, in accordance with various embodiments. FIG. 5, for example, can represent an alternative embodiment to FIG. 1B. Instead of a stationary heater fixed to the housing frame, the toaster 500 in FIG. 5 includes a movement mechanism 502 that enables the heater 506 to angularly sweep across a food item in a slot 522 of the toaster 500. For example, the movement mechanism 502 can include a bearing, a pivot, a hinge, a dial, etc. that anchors the heater 506 to a housing frame 518 defining the slot 522, enabling the heater 506 to rotate around the movement mechanism 502. In some embodiments, the movement mechanism 502 includes a motor (not shown) that rotates the heater 506 around. In some embodiments, an external motor (not shown) can rotate the heater 506 around the movement mechanism 502. Such motor or external motor can be controlled by a controller (e.g., the computing device in FIG. 2).

Figure 6:
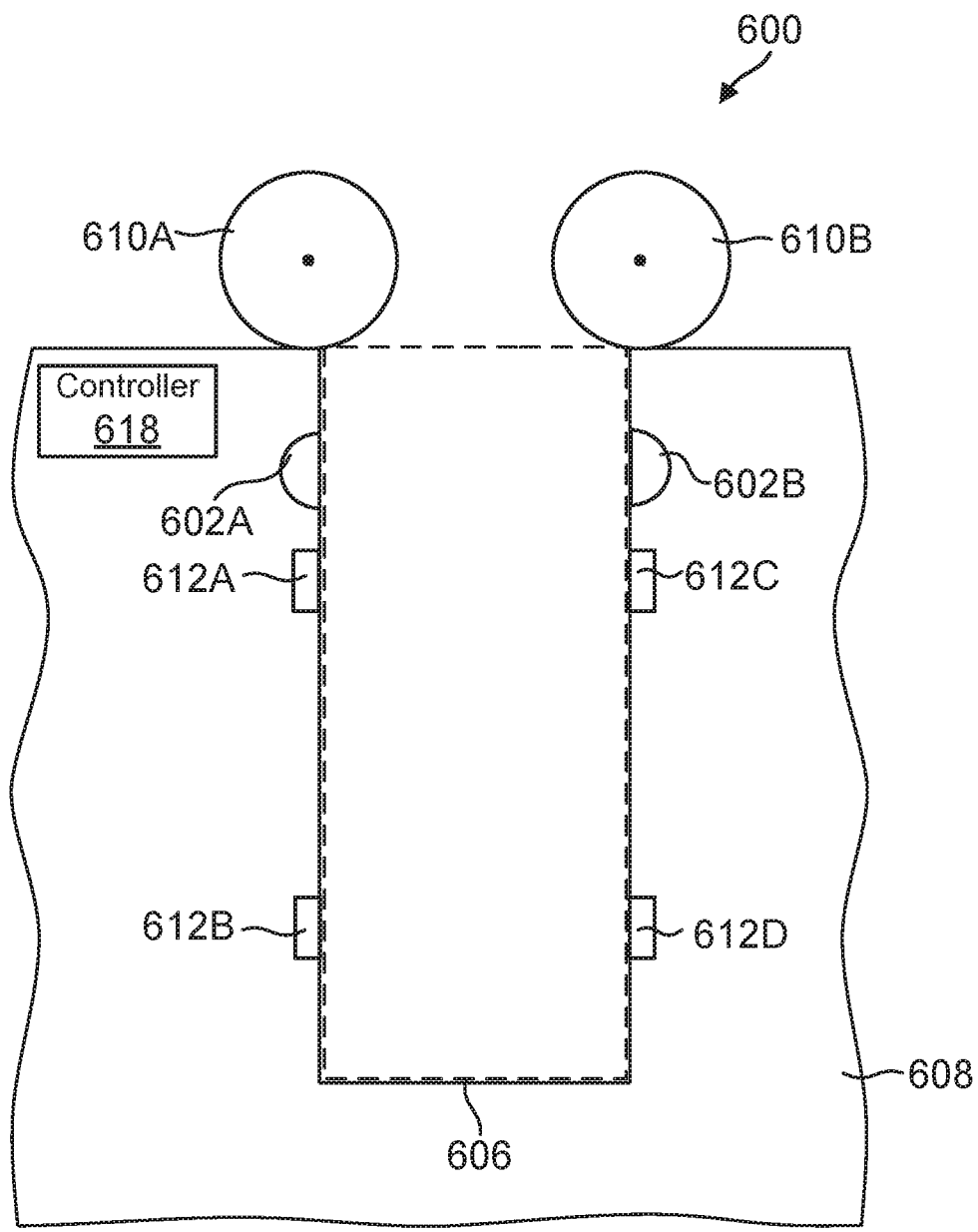
FIG. 6 is a cross-sectional view of an example of a toaster, in accordance with various embodiments.

FIG. 6 is a cross-sectional view of an example of a toaster 600, in accordance with various embodiments. FIG. 6, for example, can represent an alternative embodiment to FIG. 1C. The toaster 600 in FIG. 6 includes heaters (e.g., a heater 602A and a heating 602B, collectively as the "heaters 602") on either side of each slot (e.g., a slot 606 as defined by a housing frame 608) in the toaster 600. The heaters 602 can be linear heaters with a length that is substantially similar to the width of a typical bread slice or other food items for toasters. The length can be the width (not shown in the cross-sectional view) of the slot 606. Because the linear heaters only cover a horizontal segment of the food item in the slot 606, the toaster 600 utilizes holders 610 (e.g., a holder 610A, a holder 610B, etc., collectively as the "holders 610") to move the food item to sweep horizontal segments of the food item linearly across the heater. For example, the holders 610 can be roller structures. The toaster 600 can include one or more optical detectors (e.g., an optical detector 612A, an optical detector 612B, an optical detector 612C, an optical detector 612D, collectively as the "optical detectors 612"). For example, each of the optical detectors 612 can includes one or more light sources and/or one or more light sensors as described for FIGS. 1B and 1C.

In some embodiments, the holders 610 can be cylinders. A controller 618 (e.g., the computing device in FIG. 2) can be configured to move or rotate each of the holders 610 to adjust the food item's relative position to the heaters 602. In some cases, the cylinders can have rough surfaces or have spikes such that when rotated, the food item would be move downward toward the heater. In some cases, the cylinders can have smooth surfaces such that when the cylinders move apart from one another, the food item slides down. In some embodiments, the cylinders are spring-loaded with a spring force directed towards each other.

In some embodiments (not shown), the holders 610 can angularly sweep (e.g., rotate) the food item around a diagonally situated heater (such as one shown in FIG. 5). In some embodiments, the holders 610 is configured to move the food item at a constant speed without a speed adjustment mechanism to simplify its design.

Example Embodiments

In some embodiments, the heater 602A and the heater 602B are mechanically coupled to the housing frame 608 defining the slot 606 and sandwich around the slot 606. The housing frame 608 can space the heater 602A and the heater 602B sufficiently apart to hold a food item in the slot 606. One or more optical feedback components (e.g., any combination of the optical detectors 612 and the light sources) can be configured to measure light intensity at one or more regions in the slot 606 perpendicular to an opening of the slot 606 and/or parallel to a larger surface of the food item, such as the sliced surface of a bread loaf. For example, the optical feedback components can be part of the optical feedback system 222 of FIG. 2. The controller 618 (e.g., ASIC or general-purpose processor configured by firmware) can control the heater 602A and/or the heater 602B based on an output of the optical feedback components.

In some embodiments, an emission surface of the heater 602A or the heater 602B can be smaller than a larger surface of the food item (e.g., corresponding to an area defined by the depth of the slot 606 and the width of the slot 606). In some embodiments, the width of the emission surface can be substantially the same as a width of the food item and the width of the slot 606.

In various embodiments, the toaster 600 includes a movement mechanism (e.g., including the holders 610). In some embodiments, the movement mechanism moves the heaters 602. In some embodiments, the movement mechanism moves the foodstuff in the slots 606. The holders 610 can be adapted to cause the heaters 602 and the food item to move relative to one another. In some embodiments, the controller 618 is configured to control the holders 610 based on the output of the optical feedback components.

In some embodiments, the toaster 600 can include a power component (e.g., the power supply 202) adapted to draw from an external power source and provide power to one or more of the heaters 602 up to an expected maximum. The controller 618 and the power component can be configured to prevent the power draw from exceeding the expected maximum. Because of a power draw upper limit, the heaters 602 having an emission surface smaller than the larger surface of a food item enables the toaster 600 to toast at a higher power density despite the same upper limit to power draw. This setup enables faster toasting such that internal moisture of the bread does not evaporate before toasting is complete. The movement mechanism (e.g., the holders 610) enables the heaters 602 to "scan" through the larger surface of the food item. In various embodiments, the movement mechanism can move the food item or the heater 602 themselves.

In some embodiments, at least one of the optical detectors 612 is configured to rely on electromagnetic emission from at least one of the heaters 602 as a light source. In some embodiments, the controller 618 is configured to control one or more of the heaters 602 based on an output of the optical detectors 612. For example, the controller 618 can adjust a power intensity or an emission spectral distribution of the heater 602. In some embodiments, the controller 618 can adjust the power intensity or the emission spectral distribution by modulating (e.g., pulse modulating) power provided to the heaters 602.

FIG. 7 is a cross-sectional view of an example of a toaster 700, in accordance with various embodiments. FIG. 7, for example, can represent an alternative embodiment to FIG. 1C. Similar to the toaster 100 of FIG. 1, the toaster 700 can include optical feedback components 702A-D. Each of the optical feedback components 702A-D can be one or more light sources, one or more optical sensors, one or more cameras, or any combination thereof. The toaster 700 can include a descent carry mechanism. The descent carry mechanism can include a carrier platform 706 mechanically coupled to a movement mechanism 704 that controls the movement (e.g., descent) of the carrier platform 706. In one example, the movement mechanism 704 that controls the movement can be a motor or a servo that directly moves the carrier platform 706 down (or up) toward or away from heating elements (e.g., a heating element 710A, a heating element 710B, etc., collectively as the "heating elements 710"). Optionally, a rail 712 for the carrier platform 706 can be used to guide the carrier platform 706 to move up or down from slots of the toaster (e.g., a slot 708A or a slot 708B). In another example, the movement mechanism 704 that controls the movement can be a braking mechanism that slows down descent of the carrier platform 706 caused naturally by gravity. In some embodiments, the descent carry mechanism includes a stopper 714 that prevents the carrier platform 706 to move beyond a certain point (e.g., outside of the slot 708A or the slot 708B). In various examples, a controller (e.g., a computing device of FIG. 2) can control the movement mechanism 704 (including, e.g., a motor, a servo, and/or a braking mechanism) and thus the speed of the descent. For example, the controller can control the movement mechanism 704 based on a measurement from the optical feedback components 702A-D. In some embodiments, the descent carry mechanism is configured to move at a constant speed without a speed adjustment mechanism to simplify its design.

FIG. 8 is a graph illustrating a temperature trace 800 of a heating element over time using an unmodulated method of driving the heating element. In the illustrated example, at an initial time $t_0$ 802, the power to the heating element is turned on (e.g., from no power to a constant supply of DC power or rectified AC power). At the initial time 802, the temperature of the heating element is substantially the same as the temperature in a cooking chamber (chamber temperature) that the heating element is in. After the initial time 802, there is a ramp-up period 806. During the ramp-up period 806, the temperature of the heating element increases drastically prior to reaching a point of equilibrium 810. At the point of equilibrium 810, the rate of temperature dissipation of the heating element becomes substantially equal to the rate of temperature increase due to the electrical driving power. After the power turns off at termination time $t_f$ 814, the temperature of the heating element decreases (e.g., approximately an exponential decay) until it reaches the chamber temperature.

The total heater-on time 816 starts from the initial time 806 to the termination time 814. Because a substantially constant temperature is only maintained from the point of equilibrium 810 to the termination time 814 and because the emission spectral power distribution of the heating element depends on the temperature, a substantially constant cooking characteristic is maintained from the point of equilibrium 810 to the termination time 814. This unmodulated method of driving the heating element can only maintain a single cooking characteristic by relying on the heat dissipation equilibrium.

Figure 9:
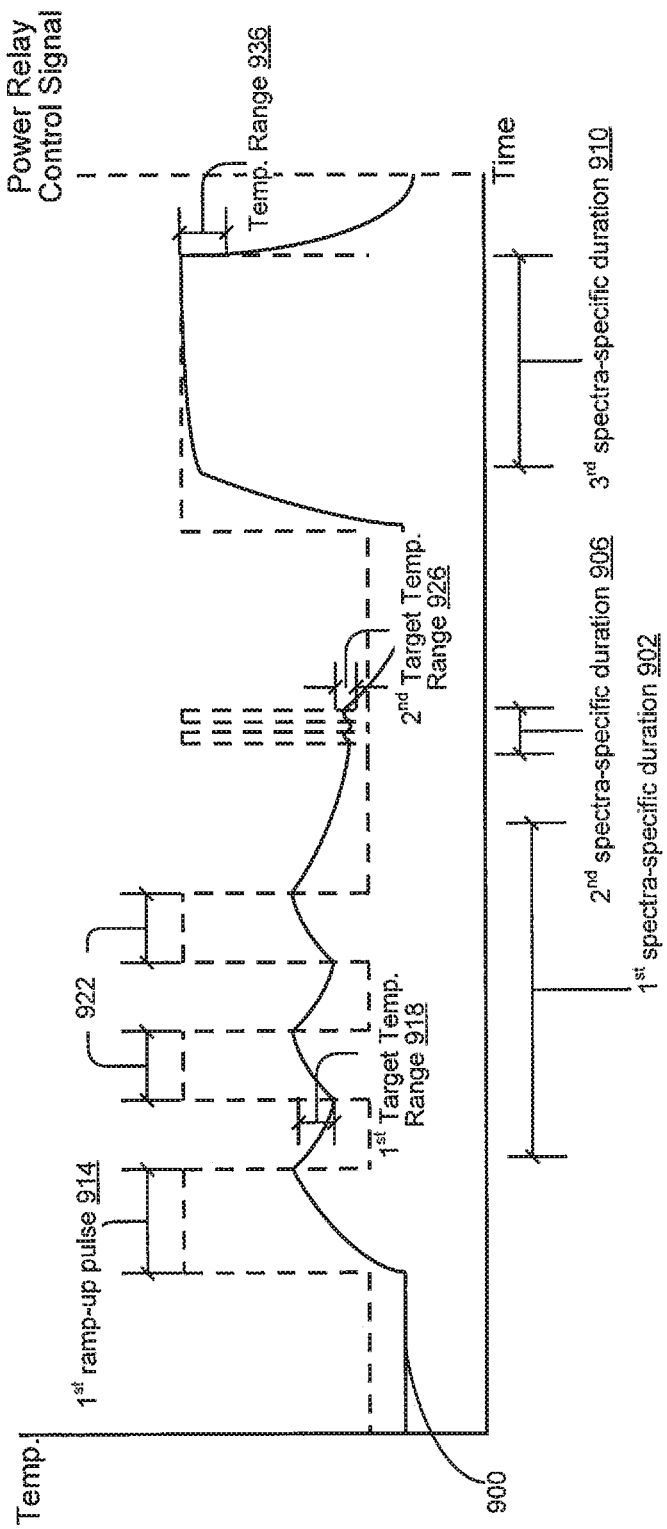
FIG. 9 is a graph illustrating a temperature trace of a heating element over time using a pulse modulation method of driving the heating element, in accordance with various embodiments.

FIG. 9 is a graph illustrating a temperature trace 900 of a heating element over time using a pulse modulation method of driving the heating element, in accordance with various embodiments. While the temperature trace 900 illustrates just a first spectra-specific duration 902, a second spectra-specific duration 906, and a third spectra-specific duration 910, the pulse modulation method of the various embodiments can support more than three emission spectral power distribution configurations for the heating element.

In the illustrated example, in the first spectra-specific duration 902, the heating element can be driven by a series of electrical pulses. During a first ramp-up time 914, the temperature trace 900 of the heating element rises until it reaches the maximum amount in a first target temperature range 918. The temperature trace 900 then decays until a series of electrical pulses 922 starts to drive the heating element. The temperature of the heating element then rises (during each of the electrical pulses 922) and falls (between each of the electrical pulses 922) within the first target temperature range 918. As described above, because the spectral power distribution of waves emitted from the heating element corresponds to the temperature of the heating element and because the temperature of the heating element is maintained within the first target temperature range 918, the electrical pulses 922 substantially maintain the spectral power distribution of the waves emitted from the heating element within a tolerable variance corresponding to the first target temperature range 918. In some embodiments, each electrical pulse comprises one or more rectified half waves of AC power cycles. In some embodiments, each electrical pulse can be a DC pulse (e.g., square waves).

Utilizing different pulse modulation configurations (e.g., different pulse width/duty cycle and different pulse frequency), the temperature can be kept at a second target temperature range 926 in the second spectra-specific duration 906. The pulse modulation method can also still utilize the temperature dissipation equilibrium similar to the graph in FIG. 8. In the third spectra-specific duration 910, the heating element can be driven by a wide pulse of rectified power signal to maintain the temperature within a third target temperature range 936. For example, the wide pulse can be the pulse modulation at a higher wavelength than the pulse modulation during the first spectra specific duration 902.

Figure 10:
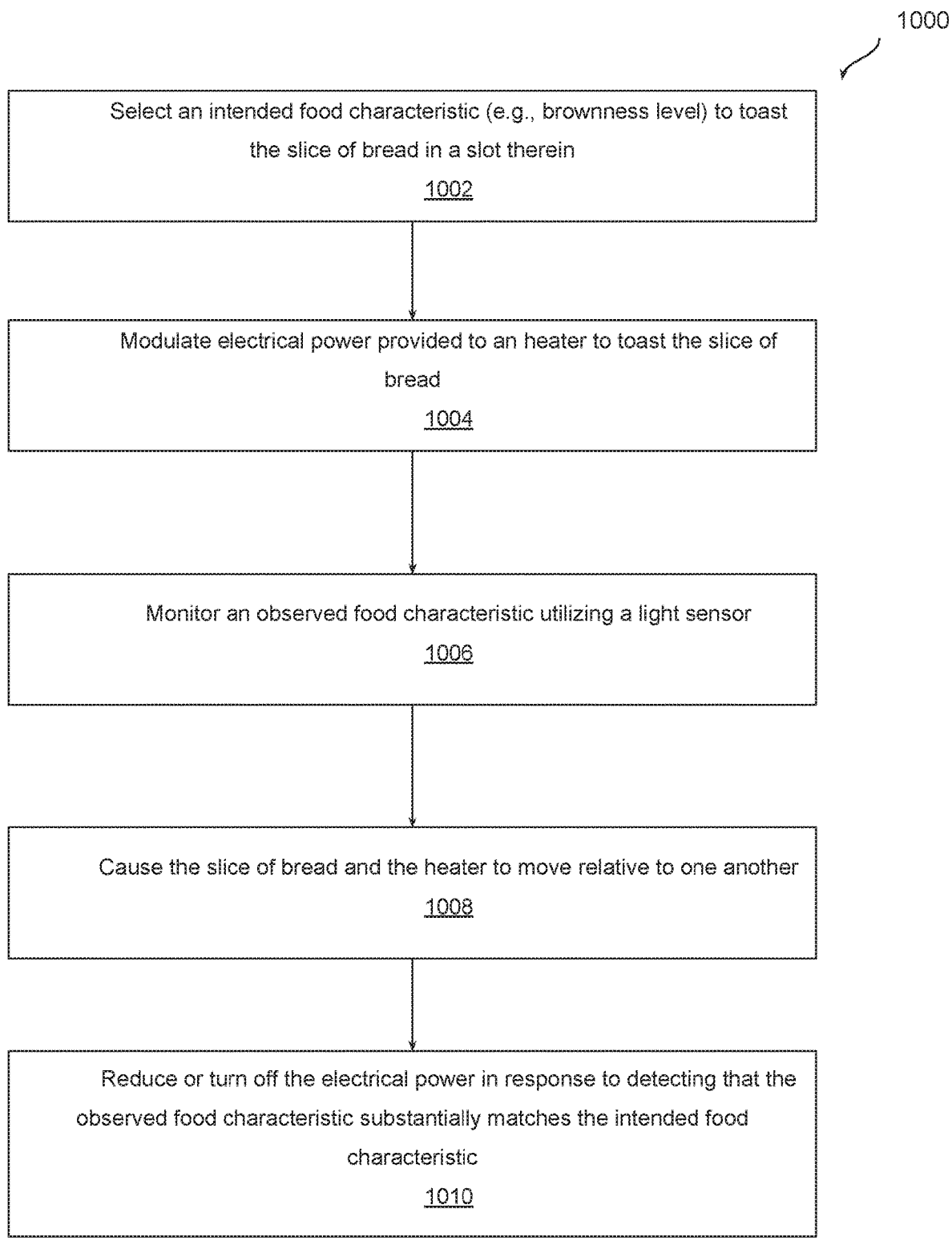
FIG. 10 is a flow chart illustrating a method of operating a cooking instrument, in accordance with various embodiments.

FIG. 10 is a flow chart illustrating a method 1000 of operating a cooking instrument (e.g., the toaster 100 and/or the cooking instrument 200), in accordance with various embodiments. In various embodiments, the cooking instrument can include a slot for a food item (e.g., a slice of bread) and multiple light sensors corresponding to different regions parallel to a larger surface of the food item and/or perpendicular to an opening of the slot. At step 1002, the cooking instrument can select an intended food characteristic (e.g., brownness level) to toast the food item in a slot therein. At step 1004, the cooking instrument can modulate (e.g., pulse modulate) electrical power provided to an heater (e.g., the first heater 110A) to toast the food item. The heater can be a heater capable of emitting electromagnetic waves in the infrared and/or near-infrared heater spectrum. For example, the cooking instrument can configure the pulse modulation to select an emission spectral distribution corresponding to a heat penetration depth that is substantially less than half the width of the slot (e.g., when there are heaters are both side of the slot for the food item). In some embodiments, the cooking instrument can determine the thickness of the food item by detecting the transmissivity of light emitted from a light source (e.g., the heater or another light source) through the food item utilizing a light sensor. Then, the cooking instrument can configure the pulse modulation to select an emission spectral distribution corresponding to a heat penetration depth based on the determined thickness.

At step 1006, the cooking instrument can monitor an observed food characteristic utilizing a light sensor. For example, step 1006 can include detecting that the observed food characteristic substantially matched an intended food characteristic. The observed food characteristic can correspond to only a portion of the food item substantially and/or directly covered by or exposed to an emission surface of the heater. In some cases, the cooking instrument monitors the observed food characteristic by detecting, utilizing a light sensor, the transmissivity through the food item of light emitted from a light source (e.g., the infrared heater or another light source). In some cases, monitoring the observed food characteristic is by detecting, utilizing a light sensor, the reflectivity off of a toasting surface of the food item of light emitted from a light source (e.g., the infrared heater or another light source).

At step 1008, the cooking instrument can cause the food item and the heater to move relative to one another. For example, the cooking instrument can cause the food item and the heater to move relative to one another by mechanically sweeping the heater across the food item. For example, the cooking instrument can linearly and/or angularly sweep the heater across the food item.

In some embodiments, a controller of the cooking instrument can control how much the food item and the heater move relative to one another based on the observed food characteristic. In some embodiments, the closer the observed food characteristic is to the intended food characteristic, the faster the controller can move the heater away from the region corresponding to the observed food characteristic.

The cooking instrument can iterate between steps 1006 and 1008 until the cooking instrument detects that the observed food characteristic reaches the intended food characteristic. At step 1010, the cooking instrument can reduce or turn off the electrical power in response to detecting that the observed food characteristic substantially matches the intended food characteristic.

While processes or methods are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

The invention claimed is:

1. A cooking instrument comprising:
a first heater;
a second heater;
a housing frame defining a slot for a food item, wherein the first heater and the second heater are mechanically coupled to the housing frame and at least partially surround the slot, wherein the housing frame spaces the first heater and the second heater sufficiently apart to hold the food item in the slot;
one or more optical feedback components configured to measure light intensity at one or more regions in the slot perpendicular to an opening of the slot; and
a controller configured to control the first heater or the second heater based on an output of the optical feedback components detecting transmissivity of light emitted from a light source through the food item;
wherein said control includes adjusting a power intensity or an emission spectral distribution of the heater.

2. The cooking instrument of claim 1, wherein an emission surface of the first heater is smaller than a side wall of the slot perpendicular to the opening of the slot.

3. The cooking instrument of claim 2, further comprising a power component adapted to draw from an external power source and provide power to one or more of the heaters up to an expected maximum, wherein the controller and the power component are configured to prevent the power draw from exceeding the expected maximum, and wherein, under a mode of operation, the controller is configured to drive the first heater with power from the power component at the expected maximum.

4. The cooking instrument of claim 1, further comprising a movement mechanism adapted to cause the first heater and the food item to move relative to one another.

5. The cooking instrument of claim 4, wherein the controller is configured to control the movement mechanism based on the output of the optical feedback components; and
wherein the movement mechanism is adapted to scan the first heater or the second heater along a substantially straight length of the slot.

6. The cooking instrument of claim 4, wherein the movement mechanism is adapted to rotate or pivot the first heater or the second heater relative to the food item.

7. The cooking instrument of claim 1, wherein the optical feedback components include one or more light sensors, one or more cameras, one or more light sources, or any combination thereof.

8. The cooking instrument of claim 1, wherein at least one of the optical feedback components is configured to rely on electromagnetic emission from the first heater or the second heater as a light source.

9. The cooking instrument of claim 1, wherein the output of the one or more optical feedback components is a light intensity measurement indicative of transmissivity or reflectivity of electromagnetic waves at a particular wavelength, a set of wavelengths, or a range of wavelengths.

10. The cooking instrument of claim 1, wherein the output of the one or more optical feedback components is a light intensity measurement indicative of reflectivity of electromagnetic waves at a particular wavelength, a set of wavelengths, or a range of wavelengths.

11. The cooking instrument of claim 1, wherein the first heater and the second heater each comprise a filament adapted to emit electromagnetic waves in a near-infrared spectrum, infrared spectrum, and/or visible spectrum; and
wherein the one or more optical feedback components is configured to measure the light intensity generated from the first heater and/or the second heater that is reflected from or transmitted through the food item.

12. The cooking instrument of claim 1, wherein the one or more optical feedback components is configured to detect a thickness of the food item by detecting the transmissivity of the light emitted from the light source through the food item; and
wherein the controller is further configured to control the first heater or the second heater based on an output of the optical feedback components to control to an emission spectral distribution corresponding to a heat penetration depth of the food item based on the determined thickness.

13. The cooking instrument of claim 1, wherein the controller is further configured to control the first heater or the second heater by driving the heater through series of electrical pulses resulting in a corresponding series of temperature rises and falls between a desired temperature range.

14. A cooking instrument comprising:
a housing frame defining a slot to fit a food item;
a heater mechanically coupled to the housing frame and adapted to produce electromagnetic waves to heat the food item;
a movement mechanism adapted to cause the heater and the food item to move relative to one another; and
a controller configured to control power supplied to the heater to adjust a power intensity or an emission spectral distribution of said heater based on an output of optical feedback components detecting transmissivity of light emitted from a light source through the food item.

15. The cooking instrument of claim 14, wherein the optical feedback system senses electromagnetic waves that traversed into the slot.

16. The cooking instrument of claim 15, wherein the controller is configured to utilize a measurement from the optical feedback system to control movement of the movement mechanism.

17. The cooking instrument of claim 15, wherein a component of the optical feedback system is mechanically coupled to the movement mechanism or the heater.

18. A cooking instrument comprising:
a housing frame defining a slot to fit a food item;
a heater mechanically coupled to the housing frame and adapted to produce electromagnetic waves to heat the food item;
a movement mechanism adapted to cause the heater and the food item to move relative to one another; and
a controller configured to control power supplied to the heater to adjust a power intensity or an emission spectral distribution of said heater;
wherein the movement mechanism is at least partially powered by weight of the food item in the slot via a descend carry mechanism.

19. A method comprising:
selecting an intended food characteristic to toast a food item in a slot in a toaster;
controlling electrical power provided to an electromagnetic emission heater to toast the food item by pulse modulating the electrical power;
monitoring an observed food characteristic utilizing a light sensor detecting transmissivity of light emitted from a light source through the food item; and
reducing or turning off the electrical power in response to detecting that the observed food characteristic substantially matches the intended food characteristic.

20. The method of claim 19, further comprising causing the food item and the electromagnetic emission heater to move relative to one another.

21. The method of claim 20, wherein causing the food item and the electromagnetic emission heater to move relative to one another includes rotating the electromagnetic emission heater across the food item.

22. The method of claim 19, wherein the light sensor is configured to detect a thickness of the food item by detecting the transmissivity of the light emitted from the light source through the food item; and
wherein the electromagnetic heater is controlled to an emission spectral distribution corresponding to a heat penetration depth of the food item based on the determined thickness.

* * * * *